T. W. WHEATLEY.
BRAKE CONTROLLING DASHPOT.
APPLICATION FILED MAY 24, 1921.
1,436,069. Patented Nov. 21, 1922.
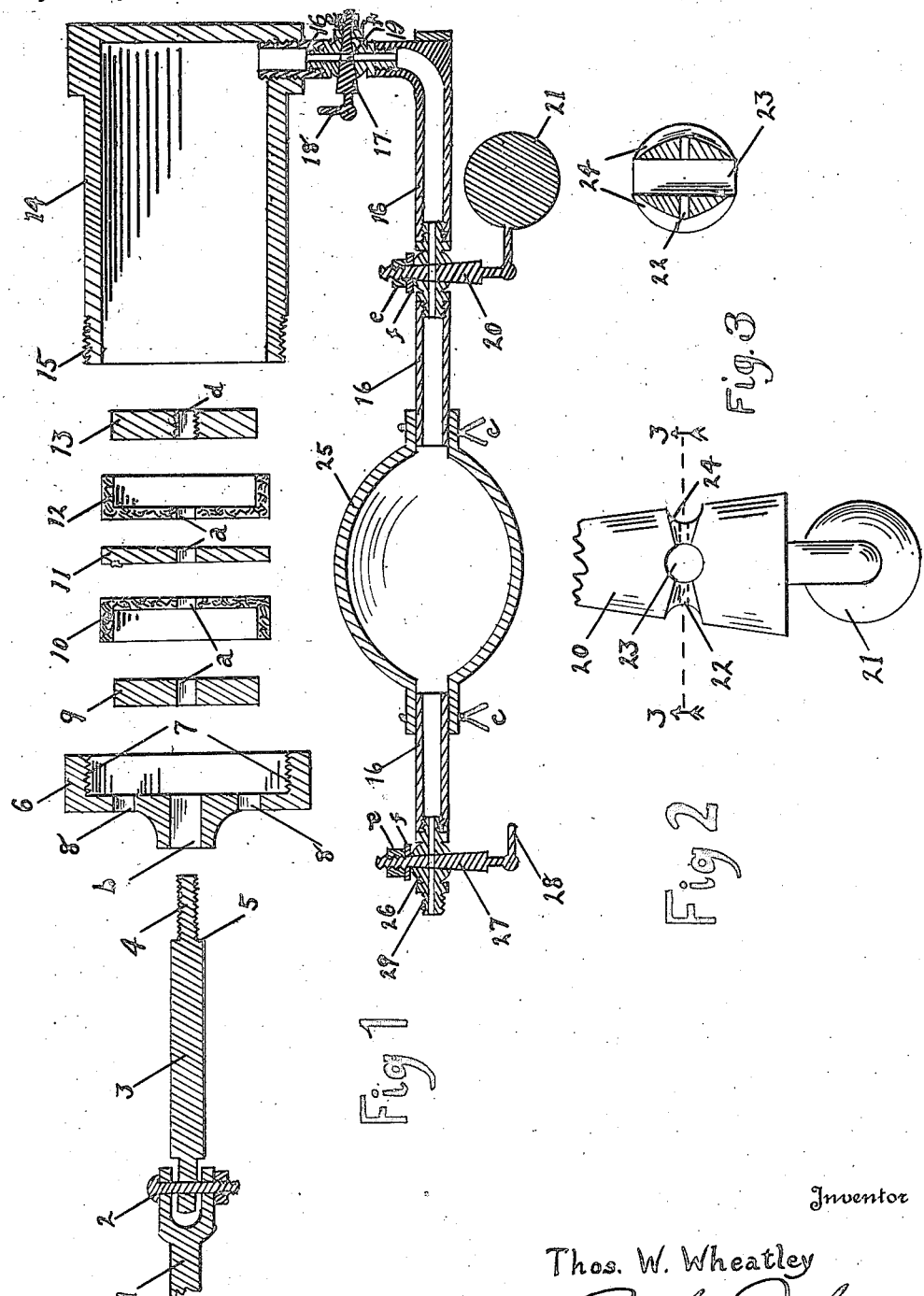

Patented Nov. 21, 1922.

1,436,069

UNITED STATES PATENT OFFICE.

THOMAS W. WHEATLEY, OF SHICKSHINNY, PENNSYLVANIA.

BRAKE-CONTROLLING DASHPOT.

Application filed May 24, 1921. Serial No. 472,059.

*To all whom it may concern:*

Be it known that I, THOMAS W. WHEATLEY, a citizen of the United States, residing at Shickshinny, in the county of Luzerne, and State of Pennsylvania, have invented certain new and useful Improvements in Brake-Controlling Dashpots; and I hereby declare that the following is a full, clear, and exact description thereof, reference being had to the accompanying drawings, which form part of the specification.

My invention relates to brake controlling dash-pots.

An object of my device is to provide a device containing liquid, air or gas for regulating the pressure exerted upon a brake.

Another object is to provide resilient force for applying pressure to a brake of an automobile or other vehicle.

Still another object is to provide means for regulating the pressure applied.

In the accompanying drawing Fig. 1 shows the parts of my device in cross section. Fig. 2 is a detailed view of valve member 20 showing annular groove 22. Fig. 3 is a section taken on the line 3—3 of Fig. 2.

Referring more particularly to the drawings 1 denotes a rod leading to an eccentric or other brake-operating means not shown. 2 denotes a threaded bolt for connection to piston rod 3, and said rod is threaded at 4 and formed with shoulders 5 which are adopted to bear against disk 9, and said thread 4 to engage with internal thread $d$ in solid disk 13. 6 denotes a cylinder-head threaded internally at 7 and provided with vent-ports 8 opening into cylinder 14. 9 denotes a solid disk adapted to fit inside a cup washer 10. 11 denotes a solid disk adapted for movement in cylinder 14. 12 denotes a cup washer similar in construction to cup washer 10 but assembled in reverse position thereto, solid disk 11 interposing as shown in Fig. 1. 13 denotes a solid disk adapted to fit inside of cup washer 12 provided with an internal thread for engagement with thread 4 on rod 3. 14 denotes a cylinder having exterior thread 15 registering with thread 7 of cylinder head 6. Leading from said cylinder is a pipe 16 having pet cock 17 embracing the conventional handle 18 and passage 19. 20 denotes a pet cock having a handle ball 21 the stem of said cock is provided with the usual passage 23 and a passage 22 of small diameter formed in said stem at right angles to passage 22. Said passages are connected by a U-shaped groove 24 circumferential of the stem as shown in Figs. 2 and 3. 25 denotes a tank of rubber or other resilient material attached to said pipe 16 by wires $c$. 26 denotes a pipe connected to pipe 16 having a pet cock 27 with conventional handle 28. The end of this pet cock is threaded at 29 for detachable connection to a liquid or gas filled receptacle not shown, $e$ denotes nuts for holding and adjusting the pet cock stems and $f$ friction washers for same.

The letters $a$ denote holes for passage of rod 3 through disks 9 and 11 and washers 10 and 12. The hole $b$ in cylinder head 6 is large enough to allow the major portion of piston rod 3 to play freely therein.

To operate my device a liquid or gas is first forced into tank 25 through pipe 26, pet cock 27 being open; this pet cock is then closed. With cocks 20 and 17 being open as shown in Fig. 1, the piston will be forced outwardly the air in the cylinder escaping through vents 8. Pressure in tank 25 being thus diminished any pressure on rod 3 would force the piston back to its first position. Pressure being in the tank, cock 17 open, and cock 20 closed there would only be the small passage way 22 shown in Fig. 3 for the pressure to pass into the cylinder. In this connection it will be noticed that by my construction of the stem of cock 20 having the U-shaped circumferential trough, there is at all times a sufficient leakage of pressure to cause more or less pressure back of the piston. When it is desired to stop all movement of the piston cock 17 is turned off.

When pet cock 17 is open I can regulate my piston by pet cock 20. Small hole 22 causes the piston to move slowly because the fluid or gas has to be pulled and pushed therethrough. By swinging the ball lever or handle 21 I turn the large hole into registration with the pipe 16, this allows the liquid or gas free ingress and egress from the cylinder 7 thus relieving the brakes. By releasing ball 21 it drops by gravity and the small hole 22 registers with pipe 16 thus causing the piston to move very slowly and by turning pet cock 17 the piston can be stopped entirely.

It will be seen that tank 25 being made of rubber or other elastic material forms an important part of my device because as the liquid or gas is drawn into the cylinder no suction accrues in the tank. As the liquid is drawn out of the tank by the upstroke of the piston the tank collapses with the atmospheric pressure and when returned by the down stroke it again expands.

When using air pet cock 26 is left open and the tank 25 does not function.

It will be seen from the foregoing that my device consists of a cylinder containing a loosely fitted piston, a cylinder partly filled with fluid, gas or air, designed to check by means of an eccentric or other braking means not shown, the turning of a shaft or wheel and to apply such pressure in varying degrees, thus avoiding sudden clamping of brakes and dragging of wheels when applied to an automobile or the like.

It will be further seen that by using a viscous liquid, gas or air, the resistance offered prevents a sudden movement of the brake to which the piston is attached.

Claim:

A brake controlling mechanism embracing a cylinder having air exit vents at one end a pressure pipe at the opposite end having a positive cutoff, a flexible fluid chamber connected to said pipe, a valve in said pipe intermediate of the cylinder and flexible chamber having a stem provided with two transverse passage ways of varying diameter arranged at right angles to each other and opening into a circumferential U-shaped groove formed on the surface of said stem and a weighted handle for operating said valve.

In testimony that I claim the foregoing as my own, I affix my signature.

THOMAS W. WHEATLEY.